US006644071B2

(12) United States Patent
Gilbertson et al.

(10) Patent No.: US 6,644,071 B2
(45) Date of Patent: Nov. 11, 2003

(54) TRAILER LOCKING SYSTEM

(75) Inventors: Mark Gilbertson, Sauk City, WI (US); Edward Raleigh, Waunakee, WI (US); Charles Russell, Oconomowoc, WI (US)

(73) Assignee: ProductSource LLC, Madison, WI (US)

( * ) Notice: Subject to any disclaimer, the term of this patent is extended or adjusted under 35 U.S.C. 154(b) by 173 days.

(21) Appl. No.: 09/728,113

(22) Filed: Dec. 1, 2000

(65) Prior Publication Data

US 2001/0023601 A1 Sep. 27, 2001

Related U.S. Application Data (60) Provisional application No. 60/168,320, filed on Dec. 1, 1999.

(51) Int. Cl.[7] .............................................. E05B 65/12
(52) U.S. Cl. .................................. 70/14; 70/58; 70/232; 280/507
(58) Field of Search ..................... 70/14, 34, 54–56, 70/58, 232, 237, 238, 258; 280/507

(56) References Cited

U.S. PATENT DOCUMENTS

| | | | | | |
|---|---|---|---|---|---|
| 3,596,926 | A | * | 8/1971 | Randall | 280/507 |
| 3,884,055 | A | * | 5/1975 | Vuillemot | 70/58 |
| 4,291,557 | A | * | 9/1981 | Bulle et al. | 70/58 |
| 4,576,021 | A | * | 3/1986 | Holden | 70/34 |
| 4,794,769 | A | * | 1/1989 | Persons | 70/232 |
| 4,794,771 | A | * | 1/1989 | Princell | 70/55 X |
| 5,033,279 | A | * | 7/1991 | Lebrecht | 70/55 |
| 5,195,339 | A | * | 3/1993 | Nee et al. | 70/14 |
| 5,255,545 | A | * | 10/1993 | Wheeler | 70/232 |
| 5,284,038 | A | * | 2/1994 | Johnson | 70/232 |
| 5,297,407 | A | * | 3/1994 | Tarr | 70/232 |
| 5,540,065 | A | * | 7/1996 | Wyers | 70/34 X |
| 5,743,548 | A | * | 4/1998 | Gaspard | 280/507 |
| 5,775,139 | A | * | 7/1998 | Sellers | 70/14 |
| 5,794,961 | A | * | 8/1998 | Niswanger | 280/507 |
| 5,873,271 | A | | 2/1999 | Smith | 70/58 |
| 5,961,140 | A | * | 10/1999 | Huskey | 280/507 |
| 6,055,832 | A | * | 5/2000 | Wyers | 70/34 |
| 6,062,583 | A | | 5/2000 | Lauricella, Jr. | 280/507 |
| 6,364,339 | B1 | * | 4/2002 | Lee | 280/507 |
| 6,382,657 | B1 | * | 5/2002 | Lynn et al. | 280/507 |
| 6,402,181 | B1 | * | 6/2002 | Lee | 280/507 |
| 6,405,569 | B1 | * | 6/2002 | Kite | 70/14 |
| 6,406,052 | B1 | * | 6/2002 | Bale | 280/507 |
| 6,408,661 | B1 | * | 6/2002 | Chen | 70/54 X |
| 6,409,203 | B1 | * | 6/2002 | Williams | 280/507 X |
| 6,412,315 | B1 | * | 7/2002 | Cheng et al. | 70/34 |
| 6,412,806 | B1 | * | 7/2002 | Peacock | 280/507 |
| 6,427,496 | B1 | * | 8/2002 | Hurst | 70/14 |

* cited by examiner

Primary Examiner—Suzanne Dino Barrett
(74) Attorney, Agent, or Firm—Craig A. Fieschko, Esq.; DeWitt Ross & Stevens S.C.

(57) ABSTRACT

A trailer hitch locking system is provided for securing a trailer while hitched to a vehicle or protecting the trailer from theft while unhitched. The locking system includes a hitch lock, a ball lock, and a receiver pin lock.

13 Claims, 6 Drawing Sheets

TRAILER LOCKING SYSTEM

CROSS REFERENCE TO RELATED APPLICATIONS

This application claims priority under 35 USC §119(e) to U.S. Provisional Patent Application No. 60/168,320 filed Dec. 1, 1999, the entirety of which is incorporated by reference herein.

FIELD OF THE INVENTION

The present invention is directed to a trailer locking system. Specifically, the present invention is directed to a set of three locks used to secure a trailer while hitched to a vehicle or to protect a trailer from theft while unhitched. The locks include a trailer hitch lock, a trailer ball lock and a receiver pin lock.

DESCRIPTION OF THE PRIOR ART

Trailer locking systems are well known to the prior art for securing a vehicle such as a trailer or the like to a pulling vehicle. A typical arrangement involves a ball hitch which is secured to the pulling vehicle. The ball hitch generally comprises a ball-shaped knob on the end of a support. The support is either fixedly or removably attached to the pulling vehicle. The ball-shaped knob generally extends upwardly to receive the trailer hitch in a ball and socket arrangement. In this manner, the trailer is fixedly secured to the pulling vehicle in a manner which allows flexibility and movement as the trailer is being pulled. The trailer hitch also typically includes a convenient D-coupler to allow the trailer to be easily removed from the pulling vehicle.

It is a common practice to disengage the trailer from the vehicle and leave it unattended. During these times, the trailer is particularly vulnerable to being stolen by simply connecting another pulling vehicle to the trailer hitch. In addition, the ball hitch can be easily removed from the pulling vehicle.

Several devices have been developed to prevent trailer theft by preventing the connection of a towing vehicle to the trailer ball socket. Exemplary devices are disclosed in U.S. Pat. No. 6,062,583 to Lauricella, Jr., U.S. Pat. No. 5,775,139 to Sellers, and U.S. Pat. No. 5,873,271 to Smith.

SUMMARY OF THE INVENTION

The present invention is designed to provide a system of integrally working locks, for securing both the trailer hitch and the ball hitch, thus preventing theft.

The present invention is first directed to a trailer socket locking device for locking a trailer hitch of a ball and socket type to a ball hitch or preventing access to the trailer socket, comprising a lock body having first and second ends, locking means at the first end of the lock body to secure and lock the locking device to the trailer hitch, and socket blocking means at the second end of the lock body to prevent access to the trailer socket.

In addition the present invention is directed to a trailer ball hitch locking device for locking a ball hitch of a ball and socket type to a ball hitch support, wherein the ball hitch is threadably attached to the ball hitch support by a ball hitch nut, comprising a plate member connected to the ball hitch support, a ball hitch nut blocker adapted to be removably attached to the plate member, wherein the blocker prevents access to the ball hitch nut, and locking means for locking the blocker to the plate member.

The present invention is further directed to a receiver pin locking device for locking a trailer support to a receiver connected to a vehicle, wherein the trailer support and the receiver include communicating channels for receiving a pin, the receiver pin locking device comprising a locking pin adapted for the communicating channels, and locking means for securing the locking pin to the receiver.

Finally, the present invention is directed to a trailer hitch locking system for securing a trailer hitch and a ball hitch of a ball and socket type, comprising the trailer socket locking device, trailer ball hitch locking device and receiver pin locking device described above.

The objects and advantages of the invention will appear more fully from the following detailed description of the preferred embodiments of the invention made in conjunction with the accompanying drawings.

DETAILED DESCRIPTION OF THE INVENTION

This invention relates to devices for securing trailers and more particularly to devices for preventing theft of trailer parts.

Figure 1:
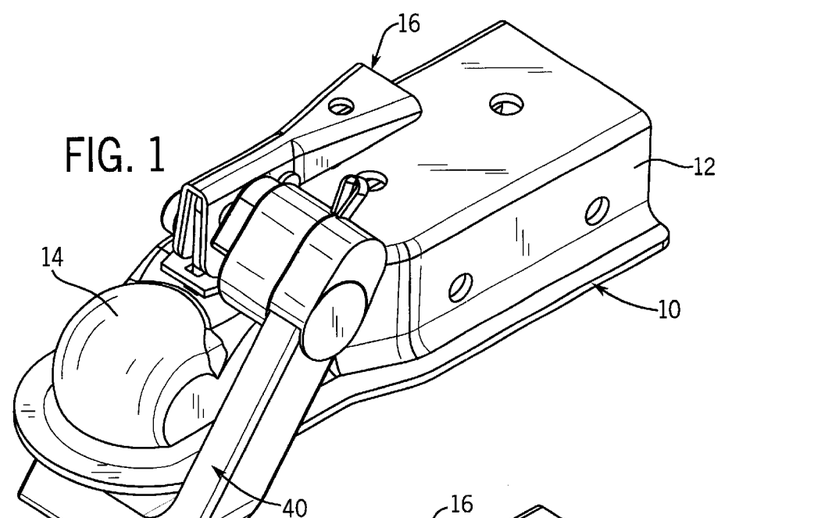
FIG. 1 is a perspective view of the trailer hitch lock of the present invention attached to a standard trailer hitch.
Figure 2:
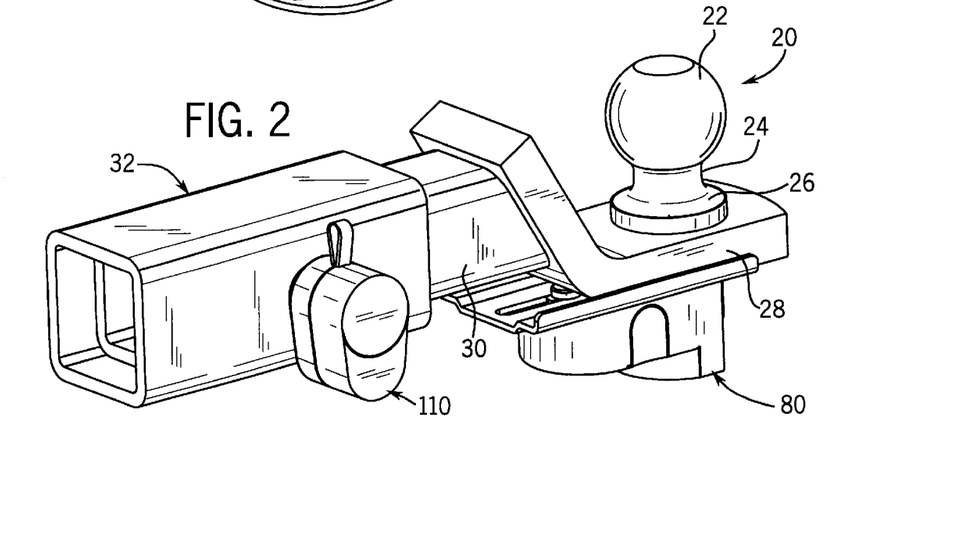
FIG. 2 is a perspective view of a ball hitch attached to the frame of a vehicle in which the ball lock of the present invention and the receiver pin lock of the present invention are attached.

Reference is now made to FIGS. 1 and 2 for the overall embodiment of the present invention. FIG. 1 illustrates a standard trailer hitch 10 which is typically attached to a vehicle or trailer (not illustrated) being towed. The trailer hitch 10 comprises an attachment bracket 12 for attachment to the vehicle, a ball hitch socket cover 14 and a lift catch 16. Referring now to FIG. 2, there is illustrated a typical ball hitch 20 which attaches to the socket 14 of the trailer hitch 10 in a manner well known to the art. The ball hitch 20 includes a pivot knob 22, a neck 24, a mounting shoulder 26 and a threaded attachment shaft (not illustrated) for removable attaching the ball hitch 20 to the ball hitch support 28. As is illustrated in FIG. 2, the ball hitch support 28 is attached to a draw bar member 30 for removable attachment to the frame of the trailer (not illustrated) via the receiver 32. The receiver 32 is fixedly attached to the frame of the vehicle.

In operation, the lift catch 16 of the trailer hitch 10 would be raised thereby allowing the socket cover 14 to be placed over the ball hitch 20. By depressing the lift catch 16, a locking mechanism is activated to connect the trailer hitch 10 and the vehicle being towed to the ball hitch 20 and the pulling vehicle.

Referring to FIGS. 1 and 2, there is illustrated a trailer hitch lock 40, a ball lock 80 and a receiver pin lock 110. These locks will be discussed in more detail hereafter. While not necessary, it is preferred that the locks will include a key mechanism which allows the locks 40, 80 and 110 to be keyed alike using existing and well known locking cylinders. Thus, the three independent locks 40, 80 and 110 can be used together for full security or separately for less comprehensive protection. The locking system adapts to the most popular styles of hitches 10 and receivers 32. Therefore, the locking system is considered universal. During trailering, the hitch lock 40 can be attached to the lift catch 16 and stowed in a rearward position on top of the hitch effectively locking the vehicle being towed to the pulling vehicle.

Trailer Hitch Lock

Figure 3:
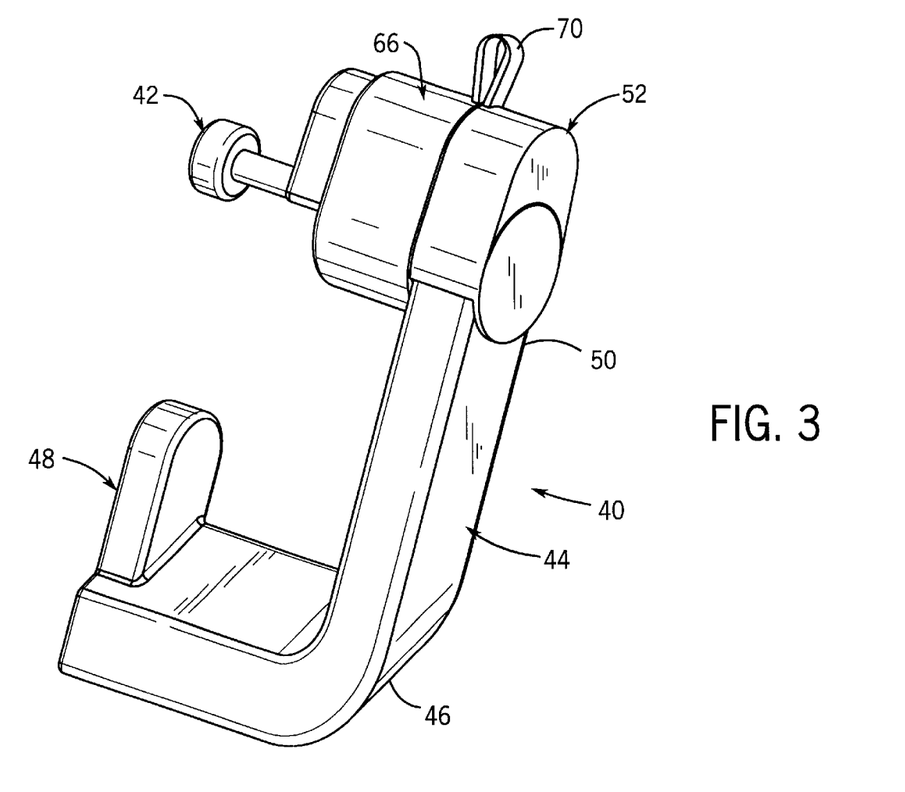
FIG. 3 is a perspective view of the trailer hitch lock of the present invention.
Figure 4:
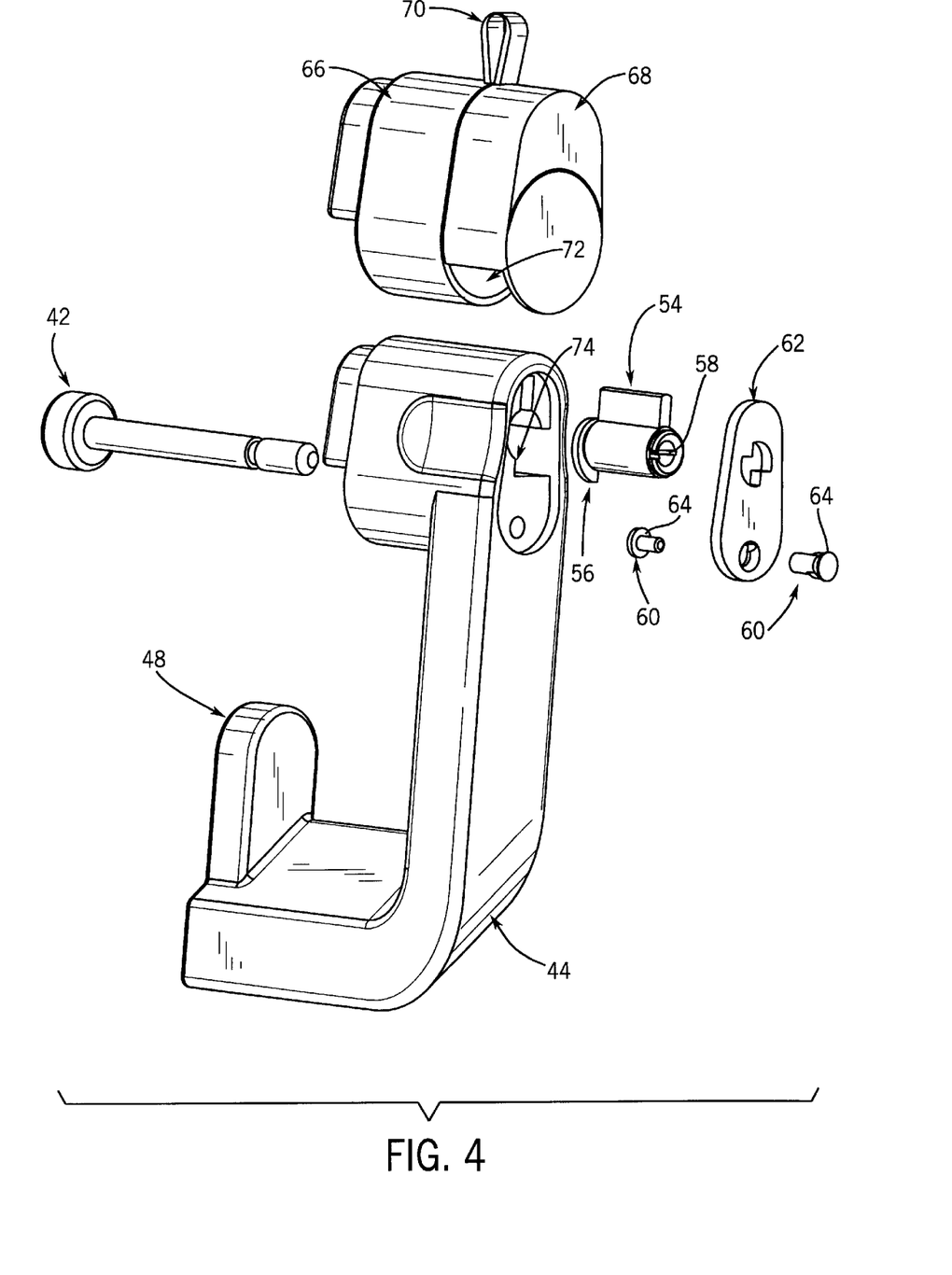
FIG. 4 is an exploded view of the trailer hitch lock of FIG. 3.

Referring to FIGS. 1, 3 and 4, there is illustrated the hitch lock 40 of the present invention. The hitch lock 40 secures the pulling vehicle or trailer by locking the lift catch 16 with a removable hardened pin 42. Universal lift catches 16 typically include a passageway for a lock to prevent the lift catch 16 from being lifted without the owners consent. The pin 42 is designed to pass through this opening and be secured to the hitch lock 40 by a keying mechanism. The hitch lock 40 comprises an extended lock body 44 distinguished at the lower end 46 by a tongue 48 and at the upper end 50 by the locking mechanism 52. The entire body 44 is designed to be constructed of hardened steel or die-cast zinc to prevent damage. The pin 42 is also hardened and is allowed to spin freely thereby reducing the likelihood of using a saw to defeat it. In addition, the shape of the entire hitch lock 40 minimizes leverage points to reduce the likelihood of a pry-bar being used to remove it. However, if the main lock body 44 of the trailer hitch 40 is broken, the pin 42 will remain in position effectively locking the lift catch 16 and offering continued deterrence.

Referring now specifically to FIG. 4, a universal lock cylinder 54 interfaces with pin 42 directly with a simple cam-shaped tab 56. A key (not shown) is used to unlock and lock the pin 42 to the hitch 40 via key slot 58. Using the key to lock the hitch 40 is a safety feature to prevent inadvertent locking of the trailer which could be an inconvenience if a trailer is locked at an inopportune time and the key has not been located. The lock cylinder 54 is captured by means of a threaded rivet set 60 which attached a cover plate 62 by means of the rivets 64.

Intrusion of dirt is prevented through the use of an elastomeric boot 66. The boot 66 is permanently attached to the lock body 44 by means of an end cap 68 tethered by a flexible hitch 70 to prevent loss.

Moisture is allowed to escape by means of standoff ribs and drainage channels 72 in the boot 66. An internal drain channels within the lock receiver 74 which prevents captured water and debris from accumulating.

Figure 1A:
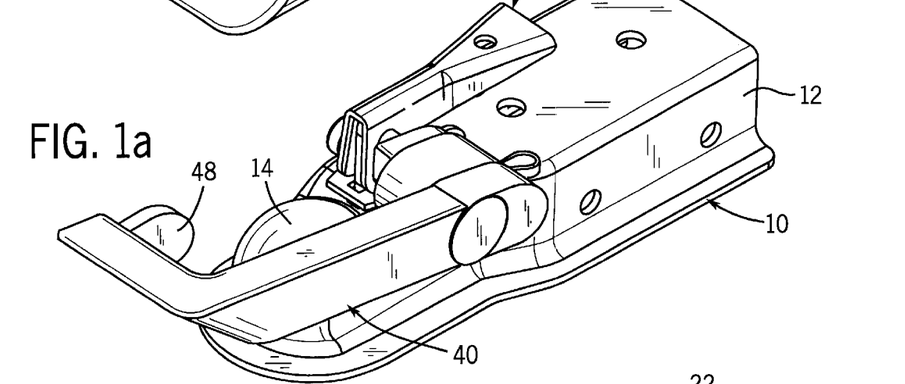
FIG. 1a is a perspective view of the trailer hitch lock of the present invention attached to a standard trailer hitch in an alternative position.

Advantageously, the hitch 40 can be used two ways. Illustrated in FIG. 1 is one embodiment in which the tongue 48 of hitch 40 is captured within the socket 40 by means of the pin 42 and locking mechanism 52. In this manner the trailer hitch 10 cannot be attached to any ball hitch and therefore the trailer cannot be moved by a towing vehicle. Alternatively, as illustrated in FIG. 1a, the lock body 44 of the hitch lock 40 can be rotated along the axis of the pin 42 above the socket 14 thereby enabling the socket to be placed on a ball hitch 20 for trailering. In this manner, the hitch 10 can be attached to the towing vehicle for use and the pin 42 and locking mechanism 52 are still useful for locking the trailer hitch 10 to the ball hitch 20.

Ball Lock

Figure 5:
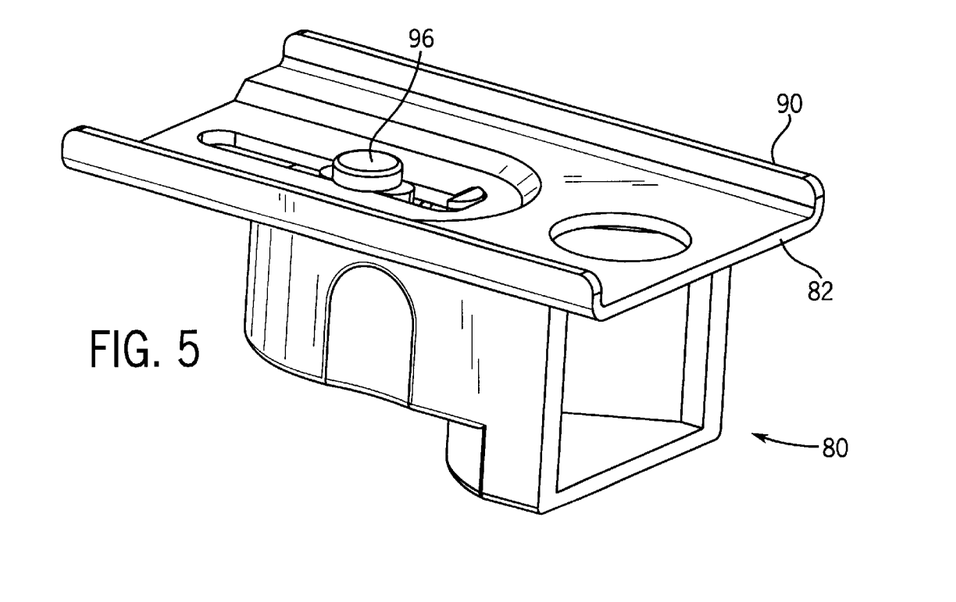
FIG. 5 is a perspective view of the ball lock of the present invention.
Figure 6:
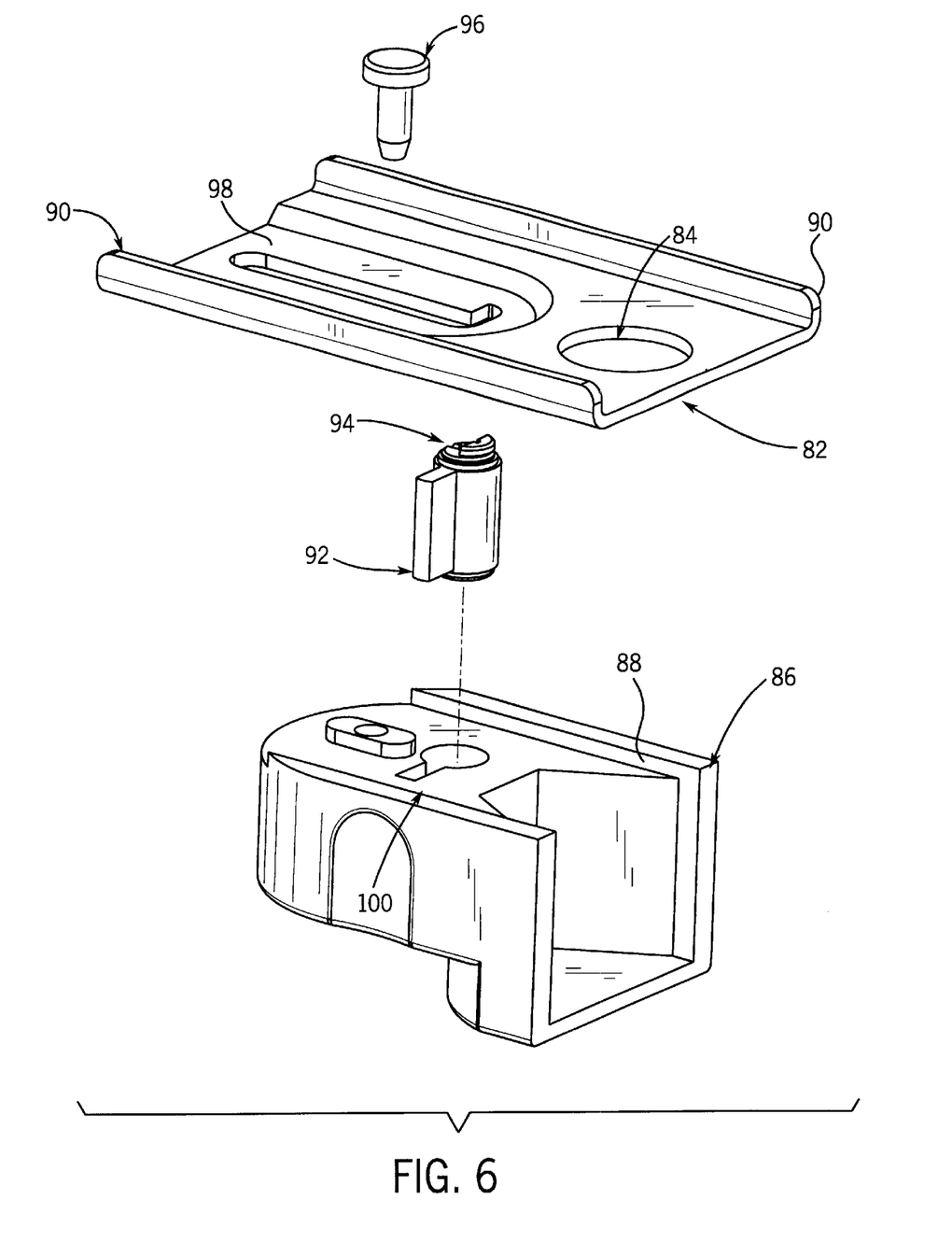
FIG. 6 is an exploded view of the ball lock of FIG. 5.

Referring now to FIGS. 2, 5 and 6, the ball lock 80 consists of an upper plate 82 which is designed to be fixedly captured by the threaded attachment of the ball hitch 20 through opening 84. In this manner, the threaded attachment of ball hitch 20 extends through an opening in the ball hitch support 28 and the opening 82 of the ball lock and is secured thereto by a ball nut.

Referring to FIG. 6, a die-cast blocker 86 is slid in position via blocker tracks 88 which communicate with tracks 90 on the upper plate thereby preventing unintended removal of the nut. Rotation of the entire ball lock assembly 80 is prevented by means of the upper tracks 90 which also communicate with ball hitch support 28. The ball lock cylinder 92 interfaces with upper plate 82 directly into an existing D-shaped detail 94. This may be replaced with a hardened extension (not shown) if desired for additional strength.

The lock cylinder 92 is captured by means of a self-tapping fastener 96 through a slot 98 in the upper plate 82. In this manner, the fastener 96 is protected from tampering by the ball hitch support 28 when the ball lock is in place. A key (not shown) is needed to unlock and lock the blocker 86. This is a safety feature to prevent inadvertent locking of the ball hitch 20 which could be a convenience concern if a ball is locked at an inopportune time and the key has not been located.

Intrusion of dirt and water is minimized by means of self-cleaning drain channels 100 within the blocker 86. Moisture and debris are allowed to escape by means of internal openings in the drain channels 100. In operation, the fastener 96 is attached to the upper plate 82. The upper plate 82 is then attached to the ball hitch support 28 by means previously described. To prevent unwanted rotation of the ball nut, the blocker 86 is then locked onto the upper plate 82 by means of the lock cylinder 92.

Pin Lock

Figure 7:
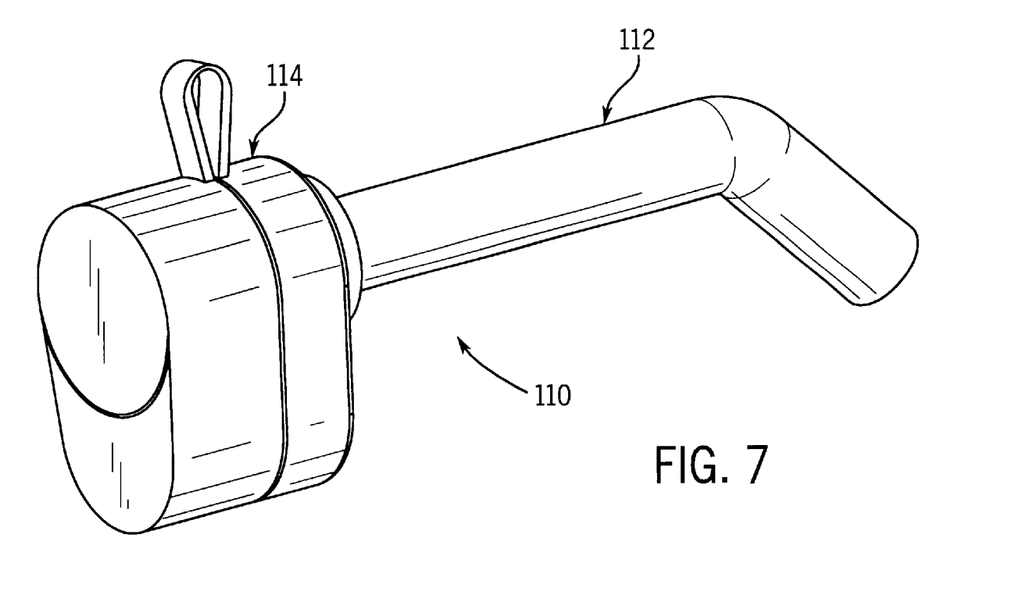
FIG. 7 is a perspective view of the receiver pin lock of the present invention.
Figure 8:
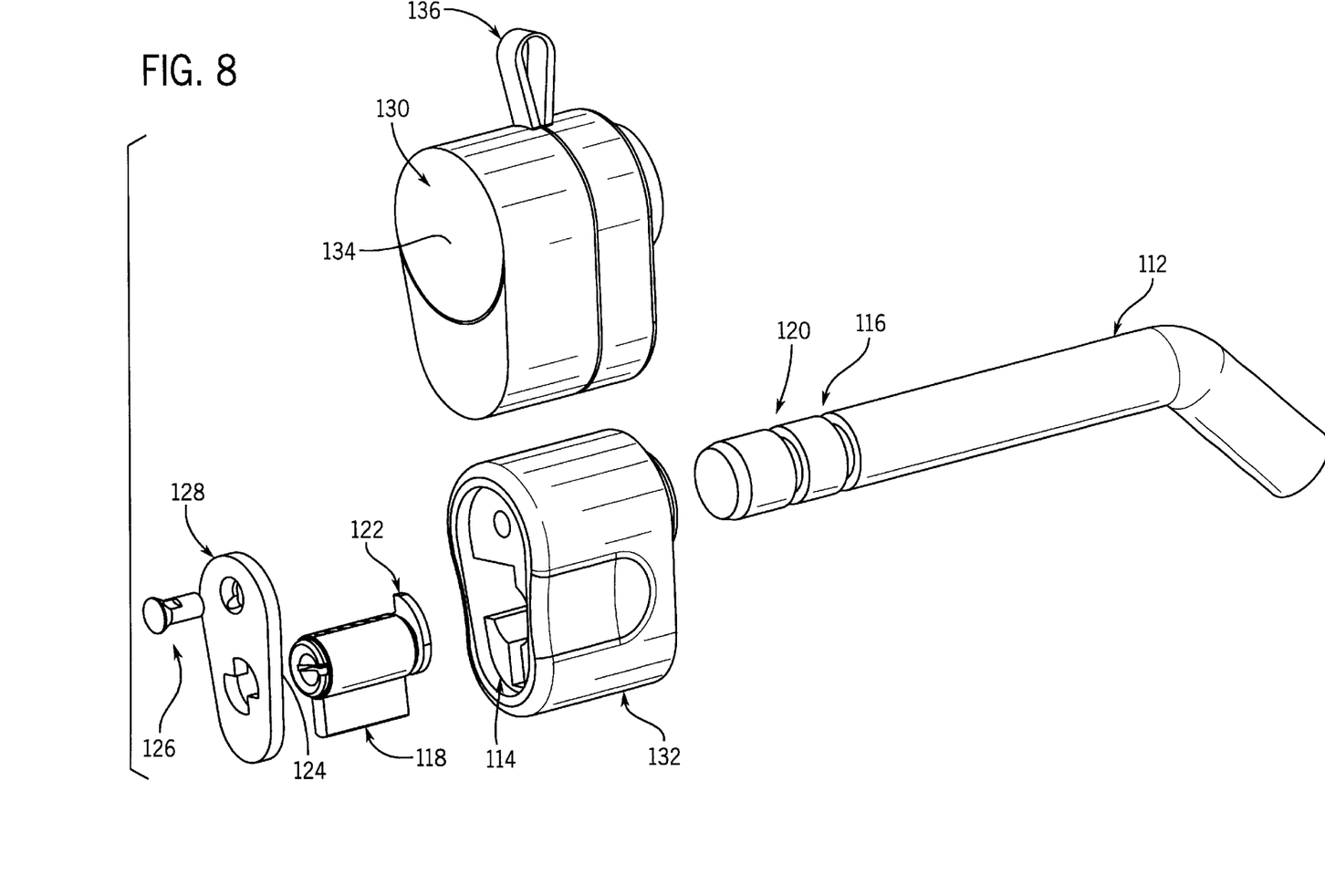
FIG. 8 is an exploded view of the receiver pin lock of FIG. 7.

Referring now to FIGS. 2, 7 and 8, there is illustrated the receiver pin lock 110. Pin lock 110 includes a receiver lock pin 112 that is secured in place with a locking end lock 114 reducing the likelihood of someone removing the ball hitch tongue 34 and inserting it into another receiver 32. The pin 112 is preferable comprised of a plated, hardened steel that will rotate if someone attempts to use a saw to cut it. A secondary safety groove 116 allows the user the option to attach an additional safety retainer key.

Referring to FIG. 8, a lock cylinder 118 interfaces with a pin groove 120 directly with a simply cam-shaped tab 122. A key (not shown) is used to lock and unlock the pin lock 110 via key slot 124. Using the key to lock the product is a safety feature that prevents inadvertent locking of the trailer which could be an inconvenience if the receiver 32 is locked at an inopportune time and the key has not been located.

The lock cylinder 118 is captured by means of a threaded rivet set 126 which attaches a cover plate 128. Intrusion of dirt is prevented through the use of an elastomeric boot 130. The boot 130 is permanently attached to the lock body 132. An end cap 134 of the boot 130 is tethered by means of loop 136 to prevent loss. Moisture is allowed to escape by means of stand-off ribs and drainage channels in the boot 130 and internal drain channels in the lock body 132 which prevent captured water and debris from accumulating.

In operation, the receiver lock pin 112 passes through openings in both the draw bar member 30 and receiver 32. The lock body 132 is then secured on the receiver lock pin 112 and keyed via lock cylinder 118 to allow it to lock. The elastomeric boot 130 is placed on the lock body 132 for protection. In this manner, the ball hitch 20 cannot be inadvertently removed from receiver 132.

Having described the three elements of the locking system of the present invention, it is apparent that each of the hitch lock 40, ball lock 80 and receiver pin lock 110 can be used alone or in combination depending upon the user's desires. In addition, the locking cylinders described in each lock can be keyed to a single key for convenience of the user.

It is understood that the invention is not confined to the particular construction and arrangement of parts herein illustrated and described, but embraces such modified forms thereof as come within the scope of the following claims. The invention is not intended to be limited to the preferred embodiments described above, but rather is intended to be limited only by the claims set out below. Thus, the invention encompasses all alternate embodiments that fall literally or equivalently within the scope of these claims. It is understood that in the claims, means plus function clauses are intended to encompass the structures described above as performing their recited function, and also both structural equivalents and equivalent structures. As an example, though a nail and a screw may not be structural equivalents insofar as a nail employs a cylindrical surface to secure parts together whereas a screw employs a helical surface, in the context of fastening parts, a nail and a screw are equivalent structures.

What is claimed is:

1. A trailer socket lock for a trailer hitch, the trailer hitch having:
   i. a ball socket defined within a socket cover,
   ii. a clamping member movable in the socket to restrain a hitch ball in the socket, and
   iii. a lift catch outside the socket cover actuatable by a user to move the clamping member within the socket, the lift catch having a locking passageway wherein a locking pin may be inserted to prevent its actuation, the socket lock comprising:
   a. an elongated locking pin having a head and an opposing locking end;
   b. a locking mechanism having a receiving aperture wherein the locking end of the locking pin may be selectively fixed;
   c. an L-shaped body which first extends from the locking mechanism, and then extends toward the locking mechanism to terminate in a tongue which extends towards the locking pin when the locking pin is fixed within the receiving aperture of the locking mechanism;
   wherein the socket lock may be situated in a locked state with:
   (1) its locking pin extending through the locking passageway of the lift catch and being fixed within the receiving aperture of the locking mechanism, and
   (2) its locking mechanism and body situated adjacent one side of the lift catch with the body:
      (a) in a blocking state extending alongside the socket cover with its tongue situated within the ball socket, or
      (b) in a non-blocking state extending atop the socket cover, with the socket cover situated between the body and the ball socket.

2. The trailer socket lock of claim 1 wherein the locking pin, body, and tongue together assume a C-shape when the locking pin is fixed within the receiving aperture of the locking mechanism.

3. The trailer socket lock of claim 1 wherein the body is unable to move between its non-blocking state and its blocking state without interference from the socket cover when the socket lock is in its locked state.

4. The trailer socket lock of claim 1 wherein the tongue extends at least substantially perpendicularly from the body.

5. The trailer socket lock of claim 1 wherein the body first extends away from the locking mechanism in a direction at least substantially perpendicular to the length of the locking pin when the locking pin is secured within the receiving aperture of the locking mechanism.

6. The trailer socket lock of claim 5 wherein the body then extends for a parallel length spaced from, and oriented at least substantially parallel to, the length of the locking pin when the locking pin is secured within the receiving aperture of the locking mechanism.

7. The trailer socket lock of claim 6 wherein the tongue then extends at least substantially perpendicularly to the parallel length of the body.

8. A trailer socket lock for a trailer hitch, the trailer hitch having:
   i. a ball socket defined within a socket cover,
   ii. a clamping member movable in the socket to restrain a hitch ball in the socket, and
   iii. a lift catch outside the socket cover actuatable by a user to move the clamping member within the socket, the lift catch having a locking passageway wherein a locking pin may be fit to prevent its actuation,
   the trailer socket lock comprising;
   a. an elongated locking pin having a head and an opposing locking end,
   b. a locking mechanism having a receiving aperture wherein the locking end may be selectively fixed,
   c. a body extending from the locking mechanism, and
   d. a lower leg spaced from the locking mechanism and extending from the body,
   wherein the locking pin may be fit within the locking passageway with its locking end fixed to the locking mechanism, with the locking mechanism and body situated on one side of the lift catch opposite the head, with the body being selectively located to extend adjacent and outside the socket cover:

(1) with the lower leg positioned adjacent to the ball socket and blocking the insertion of a hitch ball therein, or
(2) with the lower leg positioned adjacent to the socket cover, with the socket cover situated between the lower leg and the ball socket, and wherein the lower leg is restrained from moving between these positions without removal of the locking pin due to interference with the socket cover.

9. The trailer socket lock of claim 8 wherein the locking pin, locking mechanism, body, and lower leg together define a C-shape.

10. The trailer socket lock of claim 8 further comprising a tongue extending at least substantially perpendicularly from the lower leg.

11. The trailer socket lock of claim 8 further comprising a tongue extending from the lower leg in a direction oriented toward the location of the locking pin when the locking pin is fixed within the receiving aperture of the locking mechanism.

12. The trailer socket lock of claim 8 wherein the body extends from the locking pin in planes oriented at least substantially perpendicular to the length of the locking pin when the locking pin is fixed within the receiving aperture of the locking mechanism.

13. The trailer socket lock of claim 8 wherein the lower leg is oriented at least substantially parallel to the length of the locking pin when the locking pin is fixed within the receiving aperture of the locking mechanism.

* * * * *